INVENTOR.
ANDREW ALFORD
BY
*Ezekiel Wolf, Wolf and Greenfield*

ATTORNEYS

United States Patent Office 3,371,273
Patented Feb. 27, 1968

3,371,273
AUTOMATIC IMPEDANCE MEASURING SYSTEM UTILIZING A HYBRID-LIKE NETWORK OPERATIVE OVER A WIDE RANGE OF FREQUENCIES
Andrew Alford, Winchester, Mass.
(299 Atlantic Ave., Boston, Mass. 02110)
Filed July 17, 1961, Ser. No. 124,612
11 Claims. (Cl. 324—57)

The present invention relates in general to signal processing and more particularly concerns a novel system for presenting a graphical vector representation of an unknown impedance as a function of a known frequency applied to the unknown impedance. The system is operative over a wide range of frequencies with great accuracy, yet the system is relatively inexpensive and compact.

For a complete description of a prior art automatic impedance plotter, reference is made to an article by C. B. Watts, Jr. and Andrew Alford entitled, "An Automatic Impedance Plotter Based on a Hybrid-Like Network with a Very Wide Frequency Range," in the IRE National Convention Record for 1957, p. 146, part 5. The system there described includes a hybrid-like network having a series branch, a parallel branch and a pair of side branches. When the side branches are terminated in equal impedances, energy applied to one of the series and parallel branches is not delivered to the other. If a standard load is connected to one of the side branches, an unknown load connected to the other side branch, and energy applied to one of the series and parallel branches, the magnitude and phase of the energy delivered to the other of the latter branches is representative of the vector difference between the standard and unknown impedances at the frequency of the applied energy.

Means are provided for providing quadrature components of a reference signal of the same frequency as the energy applied to the hybrid-like circuit. These reference signals are respectively applied to quadrature component detecting circuits jointly energized by the vector difference signal to provide quadrature components of the vector impedance difference. These components are respectively applied to the vertical and horizontal deflection plates of an oscilloscope to deflect the spot to a position on the screen representative of the unknown impedance normalized with respect to the standard impedance on a Smith chart presentation where unity corresponds to the center of the screen. That is to say, when the standard and unknown impedances are equal, the spot remains in the center of the screen.

While the prior art system has met with wide acceptance because it accurately and rapidly facilitates impedance measurement under actual circuit conditions to facilitate adjusting an external circuit to achieve a desired condition, the operative frequency range of a single assembly has been limited somewhat by the limited available range of most phase splitters for providing the quadrature components of reference signal.

Accordingly, it is an important object of the present invention to provide an automatic impedance measuring system operative over an exceptionally wide frequency range with the same assembly of components.

It is still another object of the invention to achieve the preceding object with relatively inexpensive equipment providing accurate measurements and requiring relatively little adjustment.

According to the invention, a first terminal is arranged for receiving a first signal of a first frequency, and a second terminal is arranged for receiving a second signal of a second frequency. A network having first and second branches for connection to standard and unknown impedances, respectively, has its input coupled to the first terminal so that its output response to said first signal is an output signal of said first frequency which is representative of the vector difference in impedance between the impedance connected to the first branch and the impedance connected to the second branch. First means are provided for combining the signal on the first terminal with the signal on the second terminal to provide a reference signal of a predetermined frequency which remains substantially constant in the presence of changes in the first frequency. Second means are also provided for combining the signal on the second terminal with the signal at the network output to provide a data signal also of said predetermined frequency, the magnitude and phase of the data signal with respect to that of the reference signal being representative of the vector difference in impedance at the frequency of the signal applied to the first terminal.

According to another feature of the invention, respective narrow band amplifiers are provided for selectively amplifying the reference and the data signals. Means are provided for sensing the magnitude of the reference signal at the output of the reference signal i–f amplifier to provide a gain control signal which is utilized to maintain the reference signal amplitude substantially constant by adjusting the gain in the reference signal amplification channel. Means are also provided for proportionally controlling the gain in the data signal amplification channel.

Numerous other features, objects and advantages of the invention will become apparent from the following specification when read in connection with the accompanying drawing, in which.

Figure 1:
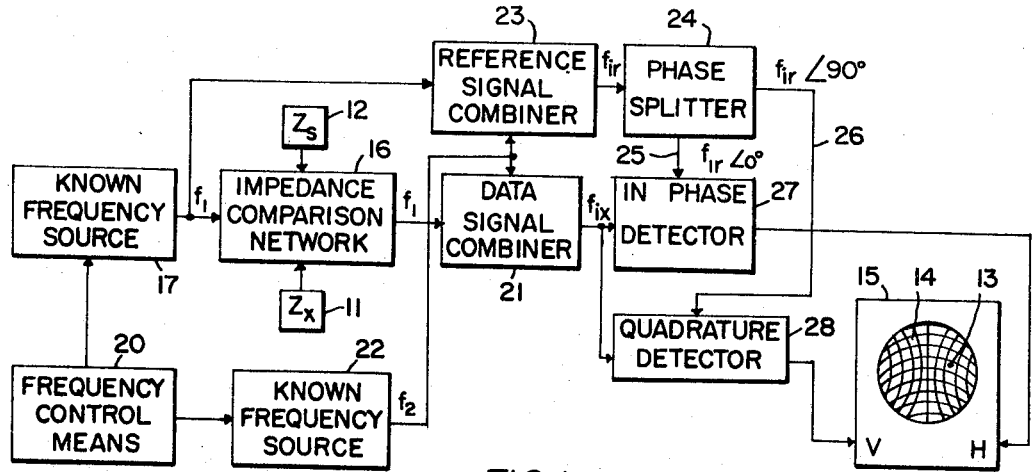
FIG. 1 is a block diagram generally illustrating the logical arrangement of an impedance plotting system according to the invention.

With reference now to the drawing and more particularly FIG. 1 thereof, there is shown the logical arrangement of a system according to the invention. The unknown impedance $Z_X$ of impedance 11 normalized with respect to the standard impedance $Z_s$ of impedance 12 is represented by the dot 13 in the Smith chart presentation on the screen 14 of oscilloscope 15 at the frequency $f_1$ applied to the input of impedance comparison network 16 from known frequency source 17.

Different forms of impedance comparison networks may be employed within the principles of the invention. However, a preferred embodiment of the invention incorporates the hybrid type network generally of the type disclosed in U.S. Patent No. 2,950,449, of Andrew Alford. That network has a pair of side branches for receiving the unknown and standard impedances 11 and 12. Energy of frequency $f_1$ from the known frequency source 17 may be applied to one of the series and parallel branches and withdrawn from the other for delivery to data signal combiner 21. The other input of data signal combiner 21 is energized by a signal of frequency $f_2$ from a second known frequency source 22 to provide a data signal of intermediate frequency, designated $f_{ix}$, the magnitude and phase of that signal being representative of the vector difference between the impedances 11 and 12 at the frequency $f_1$.

The signals from the known frequency sources 17 and 22 of frequencies $f_1$ and $f_2$, maintained at a constant difference frequency by control means 20, are applied to respective inputs of reference signal combiner 23 to provide a reference signal also of the same difference or intermediate frequency, designated $f_{1x}$. The relative phase and relative magnitude between the output signals from data signal combiner 21 and reference signal combiner 23 are representative of the phase and magnitude of the vector difference between impedances 11 and 12 at the frequency $f_1$.

Before further describing how these signals may be combined to provide other signals which may be applied to the deflection plates of the oscilloscope 15 and graphically present this vector impedance difference, it is useful to consider some of the advantages and features of the apparatus shown in FIG. 1. The sources 17 and 22 might be separate oscillators adjusted together so that the difference frequency $f_2-f_1$ remains constant and combiners 21 and 23 may be conventional mixers energizing narrow band intermediate frequency amplifiers for selectively amplifying the data and reference signals of difference frequency. This technique is generally preferred for most R-F measurements.

Control means 20 might comprise ganged tuning capacitors which vary the frequencies of respective oscillators so that the emitted frequencies $f_1$ and $f_2$ remain separated by a constant difference as the ganged capacitors are rotated. Alternatively the difference frequency may be sensed and utilized for developing a control signal for operating an electrical or electromechanical servoing system for adjusting the frequency of one of the oscillators to maintain a predetermined difference frequency as the frequency of the other oscillator is varied.

On the other hand, it may be advantageous, especially in connection with making impedance measurements over a wide range of audio frequencies, to choose the known frequencies slightly differently. Thus, if the frequency $f_1$ is an audio frequency $f_a$, it may be convenient to choose the frequency $f_2$ to correspond to $f_1+f_a$ and arrange data signal combiner 21 and reference signal combiner 23 to include a single sideband modulator. The modulating input of each of the single sideband modulators is preferably energized with a signal of frequency $f_a$ and the modulated input is preferably energized with the signal of frequency $f_1+f_a$, the single sideband provided being the lower sideband of frequency $f_1$.

Returning now to a discussion of the remaining elements of the system illustrated in FIG. 1, the reference signal of frequency $f_1$ is applied to phase splitter 24 to provide an in-phase component of reference signal on line 25 and a quadrature component of reference on line 26. The in-phase and quadrature components of reference signal are respectively applied to in-phase detector 27 and quadrature detector 28. The latter two detectors are jointly energized by the data signal from data signal combiner 21.

The outputs of in-phase detector 27 and quadrature detector 28 are respectively applied to the horizontal and vertical deflection inputs of oscilloscope 15 to produce spot 13 on screen 14 representative of the vector impedance difference between unknown impedance 11 and standard impedance 12.

Since the frequency of the signal applied to phase splitter 24 is always the same, regardless of the frequency applied to impedance comparison network 16, accurate phase splitting is obtained with relatively simple circuitry. For example, phase splitter 24 could be a delay line with the in-phase component developed at the input to the delay line and the quadrature component developed at the output of the delay line, the delay furnished by the line being a quarter period at the intermediate frequency. The in-phase detector 27 and quadrature detector 28 could be conventional phase sensitive detectors which in effect are typically mixers followed by a low-pass filter. The two detectors could be specifically embodied in the detailed form shown in FIG. 5 of the above-cited publication with the data signal being applied to the line labelled $E_s$ and the reference signal being applied to the line labelled $E_r$. This detecting system is also shown in the copyrighted publication of the Alford Manufacturing Company entitled, Automatic Impedance Plotters, in FIG. 3 on page 5.

Figure 2:
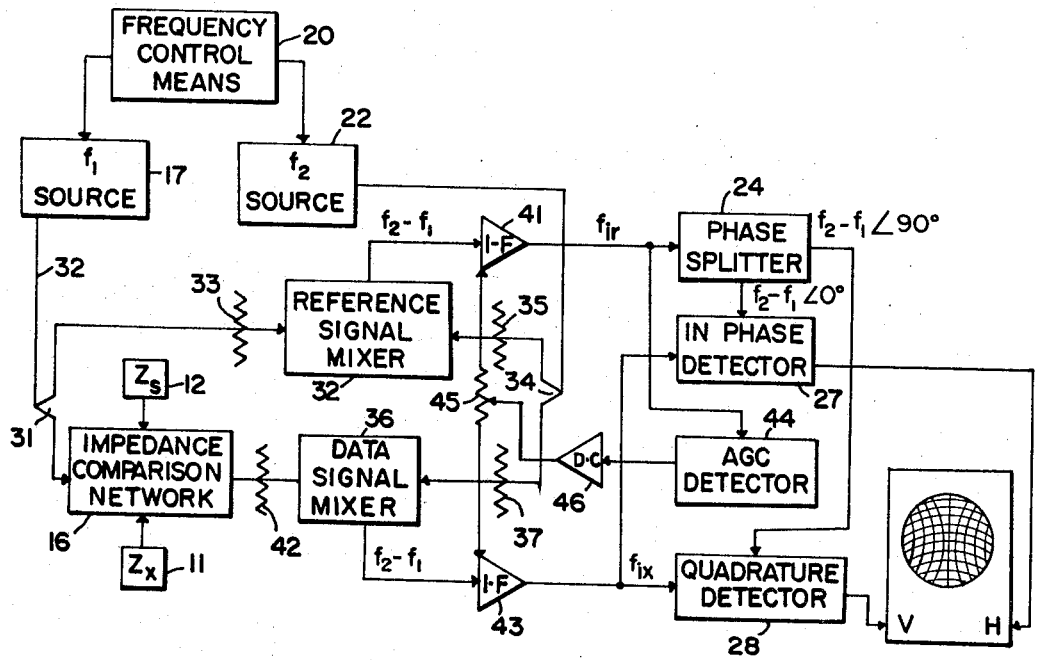
FIG. 2 is a combined block-schematic-circuit diagram generally illustrating the logical arrangement of a representative embodiment according to the invention using two sources whose frequencies are separated by said predetermined frequency.

Referring to FIG. 2, there is shown an exemplary embodiment of a system according to the invention. The same reference numerals identify corresponding elements throughout the drawing. In this embodiment of the invention the frequency of the reference and data signals is an intermediate frequency equal to the difference between the frequency of the signals delivered by sources 17 and 22.

The output of the source 17 is applied to a matching T junction 31 over line 32 which divides the incident energy, delivering part to the input of impedance comparison network 16 and part to reference signal mixer 32 through attenuating pad 33. This pad and other pads shown in the system of FIG. 2 are included to isolate the various signals and further enhance the accuracy of the system.

The signal from source 22 of frequency $f_2$ is applied over line 30 to a matching T junction 34 which delivers part of the incident energy to reference signal mixer 32 through attenuating pad 35 and part to data signal mixer 36 through attenuating pad 37. The output of reference signal mixer 32 is a signal of difference frequency $f_2-f_1$ which is applied to the reference I-F amplifier 41 for amplification and delivery to phase splitter 24.

The output of impedance comparison network 16 is coupled through attenuating pad 42 to data signal mixer 36 which provides an output signal of difference frequency $f_2-f_1$ which is applied to the data signal I-F amplifier 43 to provide the data signal of intermediate frequency which is jointly applied to in-phase detector 27 and quadrature detector 28.

It has been found advantageous to maintain the amplitude of the refernce signal applied to phase splitter 24 substantially constant. This is accomplished by detecting its amplitude with AGC detector 44 to provide a gain control signal fed back to reference I-F amplifier 41 through balancing potentiometer 45 after amplification by D-C amplifier 46. It has also been found advantageous to apply this gain control signal through the other end of balancing potentiometer to data I-F signal amplifier 43. It has been discovered that changes in amplitude of the reference signal are largely due to changes in conversion efficiency of the mixer 32 as a function of the frequency of the input signal. By using a mixer 36 which is similar to mixer 32 it has been found that the frequency sensitivity of the conversion efficiency of the two mixers is sufficiently similar so that the same gain control signal used to control the gain of the reference signal amplification channel may be used to control the gain of the data signal amplification channel and thereby render the output signals applied to the deflection inputs of the oscilloscope nearly independent of the conversion efficiency of the mixers. Actual measurements show that with the gain control system shown in FIG. 2, the amplitude of the output signals delivered by sources 17 and 22 could each be varied over a range of 12 db with less than 1 db change in the signal displayed on the screen 14 of oscilloscope 15. In addition, variation of filament and plate supply voltages produced little effect on the output actually displayed for conjoint variations of 40%.

The balancing potentiometer 45 is preferably adjusted in the following manner. The output of source 22 is varied about some mean value while adjusting balancing potenionmeter 45 to a point which results in minimizing variations of the position of spot 13 as a function of variations in the amplitude of the output signal from source 22.

It may be desirable to introduce attenuation in the path between data signal mixer 36 and I-F amplifier 43 to prevent the latter amplifier from saturating. If this amplifier saturates, the accuracy of the output indication is reduced.

Figure 3:
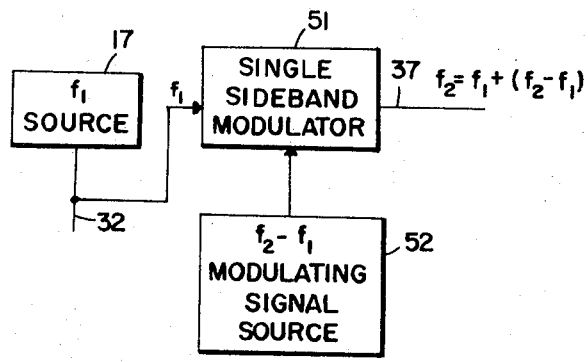
FIG. 3 shows a block diagram generally illustrating the logical arrangement of means for obtaining two input signals and maintaining them at a constant difference frequency.

Referring now to FIG. 3, there is shown a preferred system for providing the signals of frequency $f_1$ and $f_2$. The signal of frequency $f_1$ is applied to the modulated signal input of single sideband modulator 51 and the modulating input thereof is energized by a signal of difference frequency provided by modulating signal source 52 to provide the desired signal of frequency $f_2$.

Figure 4:
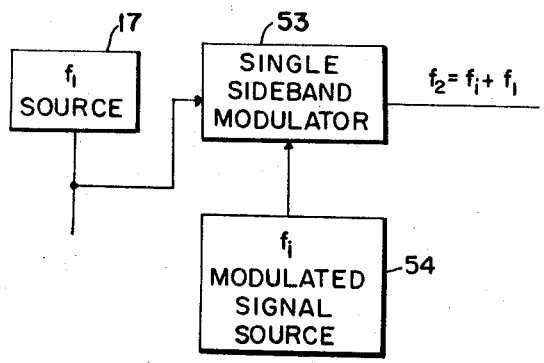
FIG. 4 shows another system for obtaining two input signals of different frequencies.

Referring to FIG. 4, there is shown an exemplary embodiment of a system useful for providing the signals of frequency $f_1$ and $f_2$ when the source 17 is an audio frequency source useful in making impedance measurements at audio frequencies. The signal of frequency $f_1$ is applied to the modulating input of single sideband modulator 53 and the modulated input of this modulator is energized by a signal of frequency $f_1$ provided by the modulated signal source 54 to provide a signal of frequency $f_2$ equal to $f_1+f_1$.

There has been described a novel signal processing system especially useful in connection with automatic impedance plotting. While a number of system elements have been specifically illustrated, such as the oscilloscopic display, specific illustration of these elements is by the way of example only. Different forms of mixers, output display devices, impedance comparison circuits and many other elements specifically illustrated herein may be employed within the principles of the invention. Since those skilled in the art may now make numerous modifications of and departures from the specific embodiments and techniques described herein without departing from the inventive concepts, the invention is to be construed as limited only by the spirit and scope of the appended claims.

What is claimed is:

1. Signal processing apparatus comprising, a source of a first signal of a first frequency, a source of a second signal of a second frequency, a network having a standard impedance, another impedance, an input and an output, said network being responsive to an input signal applied at its input for providing an output signal of the same frequency as said input signal representative of the vector difference in impedance between said standard and said another impedances, means for coupling said first source to said network input, first means for combining said first and second signals to provide a refernce signal of a predetermined frequency, means for maintaining the amplitude of said reference signal substantially constant in the presence of changes in said first frequency, and second means for combining said second signal with the output signal of said network to provide a data signal of said predetermined frequency, the magnitude and phase of said data signal with respect to that of said reference signal being representative of said vector difference in impedance at said first frequency.

2. Signal processing apparatus comprising, a first terminal for receiving a first signal of a first frequency, a second terminal for receiving a second signal of a second frequency, a network having a first terminal pair for connection to a standard impedance and a second terminal pair for connection to an unknown impedance, an input and an output, said network being responsive to an input signal applied at its input for providing an output signal of the same frequency as said input signal representative of the vector difference in impedance between the impedance across said first terminal pair and the impedance across said second terminal pair, means for coupling said first terminal to said network input, first means for combining the signal on said first terminal with the signal on said second terminal to provide a reference signal of a predetermined frequency, means for maintaining the amplitude of said reference signal substantially constant in the presence of changes in said first frequency, and second means for combining the signal on said second terminal with the signal at said network output to provide a data signal of said predetermined frequency, the magnitude and phase of said data signal with respect to that of said reference signal being representative of said vector difference in impedance at said first frequency.

3. Apparatus in accordance with claim 2 and further comprising, means responsive to the amplitude of said reference signal for maintaining a reference signal amplitude substantially constant and said data signal amplitude dependent substantially on only said vector impedance difference in the presence of variations in frequency of a signal on said first terminal.

4. Signal processing apparatus in accordance with claim 2 and further comprising, reference and data signal controllable gain means energized by said reference and said data signals respectively, and means responsive to the output of said reference signal controllable gain means for altering the gain of both said controllable gain means so as to maintain a reference signal amplitude substantially constant and said data signal amplitude dependent substantially on only said vector difference in impedance.

5. Signal processing apparatus in accordance with claim 4 and further comprising, means responsive to said substantially constant amplitude reference signal for providing first and second components thereof in time quadrature, means for combining each of said components with said data signal to provide first and second orthogonal components respectively, representative of said vector impedance difference and means for combining said first and second orthogonal components to provide an indication of the vector sum thereof.

6. Signal processing apparatus in accordance with claim 5 wherein said first and second combining means comprise first and second mixers respectively, and further comprising, a first isolating attenuator between said first terminal and said first mixer, a second isolating attenuator between said network output and said second mixer, and third and fourth isolating attenuators between said second terminal and said first and second mixers respectively.

7. Signal processing apparatus comprising, a source of a first signal of a first frequency, a source of a second signal of a second frequency, means for maintaining the difference between said first and second frequencies constant as one of said frequencies is selectively varied, a network having a standard impedance, another impedance, an input and an output, said network being responsive to an input signal applied at its input for providing an output signal of the same frequency as said input signal representative of the vector difference in impedance between said standard impedance and said another impedance, means for coupling said first source to said network input, first means for combining said first and second signals to provide a reference signal of said difference frequency, means for maintaining the amplitude of said reference signal substantially constant in the presence of changes in said first frequency, and second means for combining said second signal with the output signal of said network to provide a data signal of said difference frequency, the magnitude and phase of said data signal with respect to that of said reference signal being representative of said vector difference in impedance at said first frequency.

8. Apparatus in accordance with claim 7 and further comprising, reference and data signal controllable gain means energized by said reference and said data signals respectively, and means responsive to the output of said reference signal controllable gain means for altering the gain of both said controllable gain means so as to maintain a reference signal amplitude substantially constant and said data signal amplitude dependent substantially on only said vector difference in impedance as said first frequency is varied.

9. Apparatus in accordance with claim 8 and further comprising, means responsive to said substantially constant amplitude reference signal for providing first and second components thereof in time quadrature, means for combining each of said components with said data signal to provide first and second orthogonal components respectively of said vector impedance difference, and means for combining said first and said second orthogonal components to provide an indication of the vector sum thereof.

10. Signal processing apparatus in accordance with claim 9 wherein said first and second combining means comprise first and second mixers respectively, and further comprising, a first isolating attenuator between said first signal source and said first mixer, a second isolating attenuator between said network output and said second mixer, and third and fourth isolating attenuators between said second signal source and said first and second mixers respectively.

11. Apparatus in accordance with claim 7 and further comprising, means responsive to the amplitude of said reference signal for maintaining a reference signal amplitude substantially constant and said data signal amplitude dependent substantially on only said vector impedance difference as said first frequency is varied.

References Cited
UNITED STATES PATENTS

| | | | |
|---|---|---|---|
| 2,416,310 | 1/1947 | Hansen et al. | 324—57 XR |
| 2,685,063 | 7/1954 | Alsberg | 324—57 XR |
| 2,735,064 | 2/1956 | Salzberg. | |
| 2,760,155 | 8/1956 | Kelly | 324—57 |
| 2,778,993 | 1/1957 | Young | 324—58 |
| 2,790,143 | 4/1957 | Kyhl | 324—58 |
| 2,931,900 | 4/1960 | Goodman | 324—58 XR |
| 2,983,866 | 5/1961 | Alford et al. | 324—58 |
| 3,061,780 | 10/1962 | Watts | 324—88 XR |

WALTER L. CARLSON, *Primary Examiner.*

A. E. RICHMOND, E. E. KUBASIEWICZ,
*Assistant Examiners.*